United States Patent Office 2,704,759
Patented Mar. 22, 1955

2,704,759
PRODUCTION OF SUBSTITUTED DIHYDROPYRIDINES

Earl W. Gluesenkamp, Centerville, and Tracy M. Patrick, Jr., Dayton, Ohio, assignors to Monsanto Chemical Company, St. Louis, Mo., a corporation of Delaware No Drawing. Application August 25, 1951,
Serial No. 243,744

11 Claims. (Cl. 260—290)

This invention relates to the production of substituted dihydropyridines by the novel reaction of an aldimine with a saturated aliphatic aldehyde (an alkanal). More specifically the products of this novel process are hydrocarbon substituted dihydropyridines.

The Tschitschibabin reaction comprising the vapor phase reaction of an aliphatic aldehyde with ammonia to produce pyridine derivatives has been known for nearly 50 years. In general, reactions of this nature produce a poor yield of a complex mixture of products.

It has now been found that an aldimine can be reacted with a saturated aliphatic aldehyde containing from 2 to 8 carbon atoms, inclusive, in liquid phase with or without an inert organic solvent diluent to produce hydrocarbon substituted dihydropyridines in good yields.

This novel reaction can be shown as follows:

$$RCH=NR' + 2R''CH_2CHO \longrightarrow \text{[dihydropyridine]} + 2H_2O$$

wherein R is an alkyl radical containing from 2 to 6 carbon atoms, inclusive; R' is a hydrocarbon radical, free from non-benzenoid unsaturation, containing up to 8 carbon atoms; and R'' is the radical $—(C_nH_{2n})H$, wherein $n$ is an integer from 0 to 6, inclusive.

The suggested mechanism of the reaction is as follows:

$$RCH=NR' + R''CH_2CHO \longrightarrow \text{(I)}$$

$$(I) + R''CH_2CHO \longrightarrow \text{[intermediate]} + H_2O$$

$$H_2O + \text{[dihydropyridine A]} \longleftarrow \text{[dihydropyridine B]}$$

The position of the two heterocyclic double bonds has not been conclusively established, but the assignment shown herein providing the substituted 1,2-dihydro derivatives appears to be the most logical.

The aldimines are produced in the conventional manner by the condensation of a primary amine with a saturated aliphatic aldehyde in the presence of an alkali. This group of compounds is also known as Schiff bases.

$$RCHO + H_2NR' \rightarrow RCH=NR' + H_2O$$

Suitable aldimines are, for example:

N-propylidenemethylamine,
N-heptylideneethylamine,
N-butylidenepropylamine,
N-butylidenebutylamine,
N-heptylidenehexylamine,
N-hexylideneoctylamine,
N-pentylidene-2-ethylhexylamine,
N-2,2-dimethylpropylideneisobutylamine,
N-isobutylidenecyclopropylamine,
N-hexylidenecyclopentylamine,
N-pentylidenecyclohexylamine,
N-propylidenephenylamine,
N-propylidenetolylamine,
N-2-methylbutylidenexylylamine,
N-butylidenebenzylamine,
N-propylidenephenethylamine, and the like.

Suitable aldehydes are the 2 to 8 carbon atom, inclusive, saturated aliphatic straight and branched chain aldehydes, such as, acetaldehyde, propionaldehyde, butyraldehyde, valveraldehyde, isovaleraldehyde, caproaldehyde, heptaldehyde, caprylaldehyde, and the like.

The following examples are illustrative of the invention.

Example 1

A mixture of 63.5 g. (0.5 mole) of N-butylidenebutylamine and 108.0 g. (1.5 moles) of n-butyraldehyde was added to a reaction vessel fitted with a reflux condenser and heated to reflux (80.7° C.). The temperature slowly began to drop and traces of water appeared as the reaction mixture turned slightly yellow. One gram of benzoyl peroxide was added slowly through the condenser causing a vigorous exothermic reaction. Heating was then discontinued and the reaction allowed to proceed, the reaction mixture becoming a yellow-amber color and a large amount of water was formed. When the reaction had subsided a benzene-filled Dean and Stark trap was interposed in the system and an additional 25 cc. of benzene was added to the reaction mixture. Heat was again applied and the mixture held at reflux for about one hour at which time water was no longer being removed and the reflux temperature had reached 114° C. The trap contained 20.5 cc. of water.

The reaction mixture was then fractionated through a Vigreux column and the desired product cut was refractionated to obtain 81.9 g. of a yellow liquid having a boiling range of 127–134° C./12 mm. (mostly 132.5–133° C./12 mm.), $n_D^{25}$ 1.4843 and $$d_{25}^{25} \, 0.859$$

The product was identified as 1-butyl-3,5-diethyl-2-propyldihydropyridine and obtained in a 70 per cent yield.

Calculated for $C_{16}H_{29}N$: C, 81.58; H, 12.42; N, 5.95.
Found: C, 81.59; H, 12.26; N, 6.18.

The above experiment was substantially duplicated with the exception that benzoic acid was added in place of the benzoyl peroxide in order to ascertain whether the reaction is free radical or ionic. The results of this experiment were almost identical to those above, indicating that the reaction is probably ionic.

Example 2

A mixture of 56.5 g. (0.5 mole) of N-butylidenepropylamine and 108.0 g. (1.5 moles) of n-butyraldehyde was heated to reflux (76.6° C.) and further treated in a similar manner to Example 1. The reflux temperature at the conclusion of the experiment was 110° C. at which time the trap contained 21.5 cc. of water. A yellow liquid having a boiling range of 120–121° C./12 mm., $n_D^{25}$ 1.4860, and $$d_{25}^{25} \, 0.854$$

was obtained and identified as 3,5-diethyl-1,2-dipropyl-dihydropyridine. The yield was 66 per cent.

Calculated for $C_{15}H_{27}N$: C, 81.40; H, 12.30; N, 6.33.
Found: C, 80.79; H, 12.02; N, 6.56.

Example 3

A 500-cc., three-necked flask was fitted with a stirrer, a thermometer, and two dropping funnels. The flask was placed in an ice-bath and 25 cc. of benzene was introduced into the flask. The benzene was cooled to about 5 to 10° C. at which time the reactants were added slowly with stirring through their respective dropping funnels. The simultaneous addition of the reactants was at such a rate that it required about 10 minutes to introduce 80.5 g. (0.5 mole) of N-butylidenebenzylamine and 108.0 g. (1.5 moles) of n-butyraldehyde. Upon completion of the addition of the aforesaid reactants the ice-bath was removed and stirring continued. The two dropping funnels were removed and replaced by a reflux condenser. The practically colorless homogeneous mixture gradually turned yellow over a period of about 45 minutes during which time the temperature gradually rose to a maximum of 43° C. The mixture was then boiled at reflux for one hour, after which time a benzene-filled Dean and Stark trap was interposed in the system. After an additional two-hour reflux period a total of 14.5 cc. of water had been collected and heating was terminated.

The pale amber reaction mixture was then distilled through a Vigreux fractionating column to give 109.1 g. of a deep yellow liquid and 11.0 g. of amber viscous residue in addition to the initial lower-boiling materials. The deep yellow liquid distillate was then refractionated through a 2-ft. Vigreux column to give 45.0 g. of a yellow liquid having a boiling range of about 115° C./1.5 mm. to 118° C./2 mm., $n_D^{25}$ 1.5276, and $$d_{25}^{25}\ 0.922$$

and 43.6 g. of a yellow liquid having a boiling range of about 118° C./1.2 mm. to 122° C./1.4 mm. of mercury, $n_D^{25}$ 1.5338, and $$d_{25}^{25}\ 0.941$$

The reaction products were respectively found to be (I) N-(2-ethyl-2-hexenylidine)benzylamine (42% yield) and (II) 1-benzyl-3,5-diethyl-2-propyldihydropyridine (32% yield).

(I) Calculated for $C_{15}H_{21}N$: C, 83.68; H, 9.83; N, 6.51. Found: C, 83.94; H, 9.64; N, 6.45.

(II) Calculated for $C_{19}H_{27}N$: C, 84.67; H, 10.10; N, 5.20. Found: C, 84.57; H, 9.78; N, 5.37.

Example 4

In a similar experiment to example three, 241.5 g. (1.5 moles) of N-butylidenebenzylamine and 324 g. (4.5 moles) of n-butyraldehyde were added simultaneously through separate dropping funnels to 100 cc. of benzene over a 20-minute period. No cooling was effected during the said addition and the maximum temperature was about 52° C. Thereafter the mixture was heated at reflux for about 12 hours, during which time 59 cc. of water was collected in the Dean and Stark trap. The same products of Example 3 were obtained in substantially the same yields.

Example 5

A 131-g. (1.82 moles) portion of n-butyraldehyde was added dropwise to a solution of 97.5 g. (0.606 mole) of N-butylidenebenzylamine in 350 cc. of absolute ethanol over a 1.5 hour period. Then the mixture was refluxed for 2 hours and the products of Example 3 recovered by fractional distillation in yields of 40 (I) and 37 per cent (II), respectively.

In a similar manner to Examples 1 to 5 N-butylidenebenzylamine is reacted with propionaldehyde to produce 1-benzyl-3,5-dimethyl-2-propyldihydropyridine; N-butylidenebenzylamine is reacted with acetaldehyde to produce 1-benzyl-2-propyldihydropyridine; and the like. The 1-benzyl-2-propyldihydropyridine, for example, can then be hydrogenated and subsequently subjected to hydrogenolysis to remove the benzyl radical and replace same with a hydrogen atom to produce 2-n-propylpiperidine (coniine) as hereinafter more fully exemplified.

Several attempts were made to react N-ethylideneethylamine with acetaldehyde to prepare 1-ethyl-2-methyldihydropyridine in an analogous manner to the above examples. In one experiment a vigorous exothermic reaction took place blowing the reaction mixture out of the flask. Other experiments, wherein the reactants were added very slowly in a large quantity of benzene as a diluent and the temperature was held below about 5° C. by an ice-salt bath prior to heating, were also unsuccessful in obtaining the desired product, a large quantity of tarry residue being the principal product.

Example 6

To a solution of 19.9 g. (0.0739 mole) of 1-benzyl-3,5-diethyl-2-propyldihydropyridine from Example 3 in 150 cc. of absolute ethanol there was added 0.20 g. of platinum oxide. The mixture was hydrogenated at room temperature in a Parr hydrogenation assembly at an initial pressure of about 23.5 p. s. i. g. After 1.5 hours the pressure had dropped to 14.7 p. s. i. g., the shaker was stopped and the system refilled to 26.8 p. s. i. g. After an additional period of 1 hour, during the latter portion of which period the pressure remained substantially constant, the pressure was 24.2 p. s. i. g. The total pressure drop was 11.4 p. s. i. g. which corresponded to 0.143 mole of hydrogen absorbed, or 1.94 moles of hydrogen per mole of the aforesaid dihydropyridine.

The reaction mixture was filtered and fractionally distilled to give 18.7 g. (93%) of product. The product was redistilled and identified as 1-benzyl-3,5-diethyl-2-propylpiperidine, boiling range 119–121° C./0.5 mm., $n_D^{25}$ 1.5069, and $$d_{25}^{25}\ 0.929$$

Calculated for $C_{19}H_{31}N$: C, 83.42; H, 11.43. Found: C, 83.47; H, 11.47.

Example 7

Five grams of Raney nickel and 97.8 g. (0.364 mole) of 1-benzyl-3,5-diethyl-2-propyldihydropyridine were placed in a stainless steel rocking autoclave. The autoclave was flushed with hydrogen, then closed, the pressure raised to about 1420 p. s. i. g. at 20° C. with hydrogen and the system heated to about 150° C. in a little less than one hour, at which time the pressure was about 1800 p. s. i. g. The system was held at about 150° C. for about one hour and then at about 200° C. for about 2 hours after which heating was terminated, the system allowed to cool, and the pressure slowly released.

The reaction mixture was filtered and fractionally distilled to give 28.2 g. of toluene and 50.7 g. of a product identified as 3,5-diethyl-2-propylpyridine, boiling point 112.5° C./11.5 mm., $n_D^{25}$ 1.4920, and $$d_{25}^{25}\ 0.898$$

Calculated for $C_{12}H_{19}N$: C, 81.27; H, 10.80; N, 7.93. Found: C, 81.15; H, 11.03; N, 8.09.

Example 8

About one gram of Raney nickel, 10.6 g. of 1-benzyl-3,5-diethyl-2-propylpiperidine from Example 6 and 25 cc. of absolute ethanol were placed in a stainless steel rocking autoclave. The autoclave was closed, the pressure raised to about 1500 p. s. i. g. at 24° C. with hydrogen; the system heated to about 175° C. over a period of about 30 minutes at which time the pressure was about 2200 p. s. i. g., and held at this temperature and pressure for about 2 hours, then cooled and the pressure slowly released.

The reaction mixture was filtered and fractionally distilled to give a 35 per cent yield of a product which was identified as 3,5-diethyl-2-propylpiperidine.

Calculated for $C_{12}H_{25}N$: C, 78.61; H, 13.75; N, 7.64. Found: C, 78.17; H, 13.50; N, 7.64.

In addition to the three preceding examples it was shown that 3,5-diethyl-2-propylpyridine could be readily dehydrogenated over palladium to obtain 3,5-diethyl-2-propylpyridine and vice versa by hydrogenation over Raney nickel.

This series of hydrogenation, hydrogenolysis, and dehydrogenation reactions can be illustrated as follows:

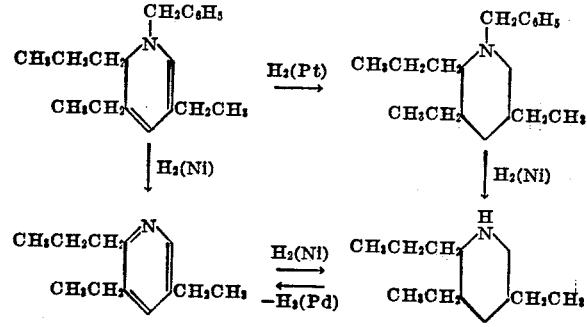

The reaction molar ratio of the aldehyde to the aldimine is seen to be 2, but the molar ratio of the reactants can be varied over a considerable range and is preferably greater than about 2, and more generally it is preferable to limit same to less than about 5 to avoid needlessly handling and recovering the excess aldehyde.

The aldehyde can also be a mixed aldehyde, preferably two aldehydes in substantially equimolecular proportions. In this manner the two R″ substituted groups can be different although the reaction mixture will also contain the two substituted products wherein the R″ groups are each identical and two mixed isomers. Where mixed aldehydes are employed the molecular sum of the aldehydes is subject to the above limits regarding the molar ratio of the aldehyde to the aldimine.

The reaction temperature and the time of reaction can be varied over a considerable range and the reaction can be carried out under pressure in the general manner well known to the art. Reaction conditions which favor decomposition of the reactants must obviously be avoided. Preferably the reactants are brought together at a rate which avoids a violent exothermic reaction and when the temperature begins to drop heat is applied and the mixture is brought to reflux and held thereat for a period of time from about 1 to about 5 hours. The course of the reaction can be followed by the rate of water formation.

When high boiling reactants are employed without the presence of an inert diluent, care should be exercised to agitate the reaction mixture properly to maintain a uniformly dispersed system.

We claim:

1. The process comprising the liquid phase reaction of an aldimine having the formula RCH=NR′ with an alkanal having the formula R″CH$_2$CHO, wherein R is an alkyl radical containing from 2 to 6 carbon atoms, inclusive, R′ is a hydrocarbon radical, free from non-benzenoid unsaturation, containing up to 8 carbon atoms; and R″ is the radical —(C$_n$H$_{2n}$)H, where $n$ is an integer from 0 to 6, inclusive, and the molar ratio of the alkanal to the aldimine is at least about 2, heating the aldimine-alkanal mixture up to about the reflux temperature of said mixture and recovering the substituted dihydropyridine reaction product.

2. The process of claim 9 wherein the aldimine is N-butylidenebutylamine, the alkanal is n-butyraldehyde, and the product is 1-butyl-3,5-diethyl-2-propyldihydropyridine.

3. The process of claim 9 wherein the aldimine is N-butylidenepropylamine, the alkanal is n-butyraldehyde, and the product is 3,5-diethyl-1,2-dipropyldihydropyridine.

4. The process of claim 9 wherein the aldimine is N-butylidenebenzylamine, the alkanal is n-butyraldehyde, and the product is 1-benzyl-3,5-diethyl-2-propyldihydropyridine.

5. The process of claim 9 wherein the aldimine is N-butylidenebenzylamine, the alkanal is propionaldehyde, and the product is 1-benzyl-3,5-dimethyl-2-propyldihydropyridine.

6. The process of claim 9 wherein the aldimine is N-butylidenebenzylamine, the alkanal is acetaldehyde, and the product is 1-benzyl-2-propyldihydropyridine.

7. The process comprising the liquid phase reaction of an aldimine having the formula RCH=NR′ with an alkanal having the formula R″CH$_2$CHO, wherein R is an alkyl radical containing from 2 to 6 carbon atoms, inclusive; R′ is an alkyl radical containing up to 8 carbon atoms; and R″ is the radical —(C$_n$H$_{2n}$)H, wherein $n$ is an integer from 0 to 6, inclusive; and the molar ratio of the alkanal to the aldimine is at least about 2, heating the aldimine-alkanal mixture up to about the reflux temperature of said mixture and recovering the substituted dihydropyridine reaction product.

8. The process comprising the liquid phase reaction of an aldimine having the formula RCH=NR′ with an alkanal having the formula R″CH$_2$CHO, wherein R is an alkyl radical containing from 2 to 6 carbon atoms, inclusive; R′ is an aralkyl radical containing up to 8 carbon atoms; and R″ is the radical —(C$_n$H$_{2n}$)H, wherein $n$ is an integer from 0 to 6, inclusive, and the molar ratio of the alkanal to the aldimine is at least about 2, heating the aldimine-alkanal mixture up to about the reflux temperature of said mixture and recovering the substituted dihydropyridine reaction product.

9. The process comprising the liquid phase reaction of an aldimine having the formula RCH=NR′ with an alkanal having the formula R″CH$_2$CHO, wherein R is an alkyl radical containing from 2 to 6 carbon atoms, inclusive, R′ is a hydrocarbon radical, free from non-benzenoid unsaturation, containing up to 8 carbon atoms, and R″ is the radical —(C$_n$H$_{2n}$)H, wherein $n$ is an integer from 0 to 6, inclusive, and the molar ratio of the alkanal to the aldimine is from about 2 to about 5, heating the aldimine-alkanal mixture to about the reflux temperature of said mixture and recovering the substituted dihydropyridine reaction product.

10. The process of claim 9 wherein R′ is an alkyl radical.

11. The process of claim 9 wherein R′ is an aralkyl radical.

No references cited.